(12) United States Patent
Galey et al.

(10) Patent No.: US 8,027,142 B2
(45) Date of Patent: Sep. 27, 2011

(54) CURRENT-PROTECTED DRIVER CIRCUIT FOR IGNITION EXCITER UNIT

(75) Inventors: Larry L. Galey, Tucson, AZ (US); Dale A. Trumbo, Tucson, AZ (US); Steven A. Lei, Marana, AZ (US)

(73) Assignee: Honeywell International Inc., Morristown, NJ (US)

( * ) Notice: Subject to any disclaimer, the term of this patent is extended or adjusted under 35 U.S.C. 154(b) by 621 days.

(21) Appl. No.: 12/132,519

(22) Filed: Jun. 3, 2008

(65) Prior Publication Data

US 2009/0107149 A1   Apr. 30, 2009

Related U.S. Application Data

(60) Provisional application No. 60/982,613, filed on Oct. 25, 2007.

(51) Int. Cl.
    *F02P 3/05* (2006.01)
(52) U.S. Cl. .......................... 361/247; 60/772
(58) Field of Classification Search ............... 60/39.821, 60/772; 361/224, 247, 56
    See application file for complete search history.

(56) References Cited

U.S. PATENT DOCUMENTS

| | | | |
|---|---|---|---|
| 3,781,637 A | 12/1973 | Potter | |
| 3,935,511 A | 1/1976 | Boulanger et al. | |
| 4,129,895 A | 12/1978 | Witting | |
| 5,030,844 A | 7/1991 | Li et al. | |
| 5,032,969 A | 7/1991 | Eggers et al. | |
| 5,446,348 A * | 8/1995 | Michalek et al. ...... | 315/209 SC |
| 5,519,264 A | 5/1996 | Heyden et al. | |
| 5,574,632 A | 11/1996 | Pansier | |
| 5,610,507 A | 3/1997 | Brittan | |
| 5,619,076 A | 4/1997 | Layden et al. | |
| 5,654,868 A * | 8/1997 | Buer ............................. | 361/256 |
| 5,828,177 A * | 10/1998 | Toda et al. .................... | 315/127 |
| 5,909,135 A * | 6/1999 | Baldwin et al. ............... | 327/328 |
| 6,008,550 A | 12/1999 | Dorsey et al. | |
| 6,195,247 B1 | 2/2001 | Cote et al. | |
| 6,426,885 B1 * | 7/2002 | Sekiguchi et al. ......... | 363/56.01 |
| 6,538,864 B2 | 3/2003 | Mullner | |
| 6,735,098 B2 | 5/2004 | Hussein et al. | |
| 6,737,845 B2 | 5/2004 | Hwang | |
| 6,958,550 B2 | 10/2005 | Gilbreth et al. | |
| 6,995,482 B2 | 2/2006 | Midya et al. | |
| 2004/0080165 A1 | 4/2004 | Geis et al. | |
| 2007/0268059 A1* | 11/2007 | Sakaguchi et al. ............ | 327/333 |
| 2008/0211237 A1* | 9/2008 | Berenger .................... | 290/40 B |

OTHER PUBLICATIONS

EP Search Report dated Apr. 6, 2009, EP 08167061.4.

* cited by examiner

*Primary Examiner* — Stephen W Jackson
*Assistant Examiner* — Angela Brooks
(74) *Attorney, Agent, or Firm* — Ingrassia Fisher & Lorenz, P.C.

(57) ABSTRACT

Methods and apparatus are provided for driving an ignition exciter unit. An apparatus is provided for a driver circuit for use with an ignition exciter unit, the driver circuit having an input terminal and an output terminal. A first current-protected circuit is coupled to the input terminal and the output terminal, wherein the first current-protected circuit is current-limited. A second current-protected circuit coupled to the input terminal and the output terminal. The driver circuit further comprises a controller coupled to the first current-protected circuit and the second current-protected circuit. The controller is configured to activate the first current-protected circuit for a first time interval and activate the second current-protected circuit after the first time interval and prior to when the ignition exciter unit begins operating.

20 Claims, 3 Drawing Sheets

CURRENT-PROTECTED DRIVER CIRCUIT FOR IGNITION EXCITER UNIT

RELATED APPLICATIONS

This application claims the benefit of U.S. Provisional Application No. 60/982,613, filed Oct. 25, 2007.

TECHNICAL FIELD

The subject matter described herein relates generally to engine control systems, and more particularly relates to drivers for ignition exciter units used in aircraft.

BACKGROUND

Aircraft electrical systems generate, regulate and distribute power throughout an aircraft, and it is essential that power is reliably maintained to these electrical systems. Often, auxiliary power units (APUs) are used to provide power to electrical systems within an aircraft when main engines are not running. Most APUs are relatively small turbines that use electrical starting power. Once the APU is running, it can function as an electrical generator for the aircraft.

Most APUs use capacitive discharge ignition systems which involves initially charging a high voltage capacitor, often using a charging circuit such as an ignition exciter unit. The ignition exciter unit includes a relatively large input capacitor, which results in an inrush current when the ignition system is first powered on. Because of the high inrush current, it is difficult to design circuit protection that does not interrupt the ignition exciter unit as a result of the inrush current yet reacts quickly to overload or short circuit conditions.

High-side driver circuits have been developed for reliably driving ignition systems used with aircraft turbines. However, these high-side drivers are based on discrete component topologies and often require thirty or more electrical components, reducing component density and increasing assembly costs. While integrated circuits have been developed for lower power applications, such devices fall short of being able to reliably drive an ignition exciter unit, mainly due to their inability to supply the high inrush-current drawn by the typical ignition exciter unit.

BRIEF SUMMARY

An apparatus is provided for a driver circuit for use with an ignition exciter unit. The apparatus comprises a driver circuit having an input terminal and an output terminal. A first current-protected circuit is coupled to the input terminal and the output terminal, wherein the first current-protected circuit is current limited. A second current-protected circuit is coupled to the input terminal and the output terminal. The driver circuit further comprises a controller coupled to the first current-protected circuit and the second current-protected circuit. The controller is configured to activate the first current-protected circuit for a first time interval and activate the second current-protected circuit after the first time interval and prior to when the ignition exciter unit begins operating.

A method is provided for driving an ignition exciter unit, where an input of the ignition exciter unit is coupled to a first current-protected circuit and a second current-protected circuit. The method comprises supplying a first current to the ignition exciter unit from the first current-protected circuit for a first time interval, wherein the first current-protected circuit limits the first current. The method further comprises supplying a second current to the ignition exciter unit from the second current-protected circuit after the first time interval and prior to when the ignition exciter unit begins operating.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown depict one exemplary arrangement of elements, additional intervening elements, devices, features, or components may be present in an embodiment of the depicted subject matter.

Figure 1:
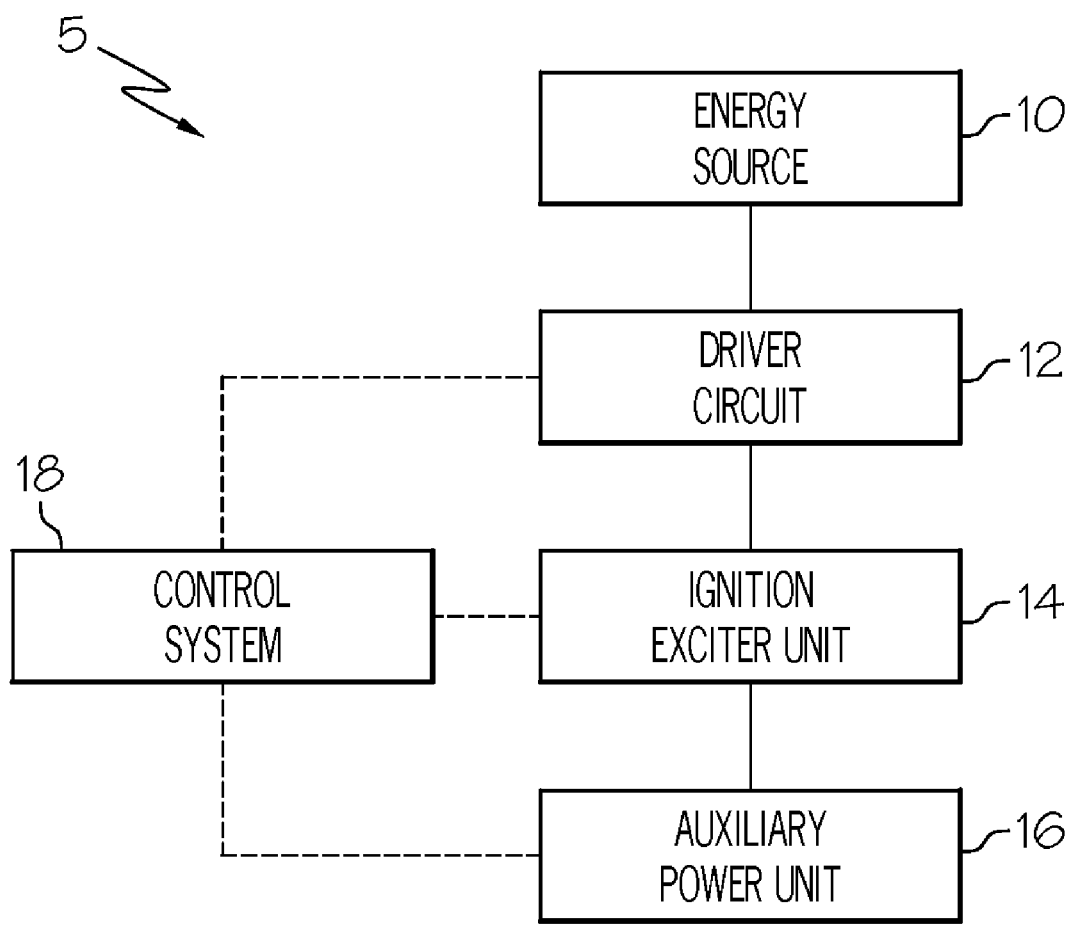
FIG. 1 is a block diagram of an operating environment in accordance with one embodiment.

Technologies and concepts discussed herein relate to auxiliary power systems used to provide power to electrical systems within an aircraft when main engines are not running. As shown in FIG. 1, an auxiliary power system 5 may include, without limitation, an energy source 10, a driver circuit 12, an ignition exciter unit 14, an auxiliary power unit 16 (APU), and a control system 18. These and possibly other components may be coupled as needed to support the operation of the auxiliary power system 5 as described in greater detail below.

Referring again to FIG. 1, in an exemplary embodiment, the energy source 10 may be coupled to a driver circuit 12, which is in turn coupled to an ignition exciter unit 14. In an exemplary embodiment, the ignition exciter unit 14 is coupled to the APU 16. The control system 18 may be coupled to the driver circuit 12, the ignition exciter unit 14, and the APU 16, and may be configured to perform various tasks and functions as described in greater detail below.

In accordance with one embodiment, the energy source 10 may comprise a battery. In other embodiments, other suitable sources of electrical energy may be used in place of or in addition to a battery as will be appreciated in the art. In an exemplary embodiment, the energy source 10 has a nominal DC voltage of 28 volts. In other embodiments, the voltage of the energy source 10 may vary between 18-32 volts, which is a common operating range for most aircraft operations. In an exemplary embodiment, the driver circuit 12, as described in further detail below, provides current from the energy source 10 to the ignition exciter unit 14 in order to start the APU 16. The ignition exciter unit 14 has a high-input capacitance and may be part of a capacitor discharge ignition system or another comparable ignition system. It will be appreciated in the art, however, that the subject matter discussed herein is not limited to use with a particular ignition system or ignition systems generally.

In an exemplary embodiment, the APU 16 may comprise a turbine engine, which may provide power to start the main engines and to support other aircraft subsystems. In an exemplary embodiment, the APU 16 uses power from the energy source 10 to start before functioning as a generator.

In an exemplary embodiment, the control system 18 may include various sensors, control modules, or electronic control units (ECUs) as will be appreciated in the art. The control system 18 may be configured to control the interaction between the driver circuit 12, the ignition exciter unit 14, the APU 16, and/or other modules throughout the aircraft, as discussed in greater detail below.

Figure 2:
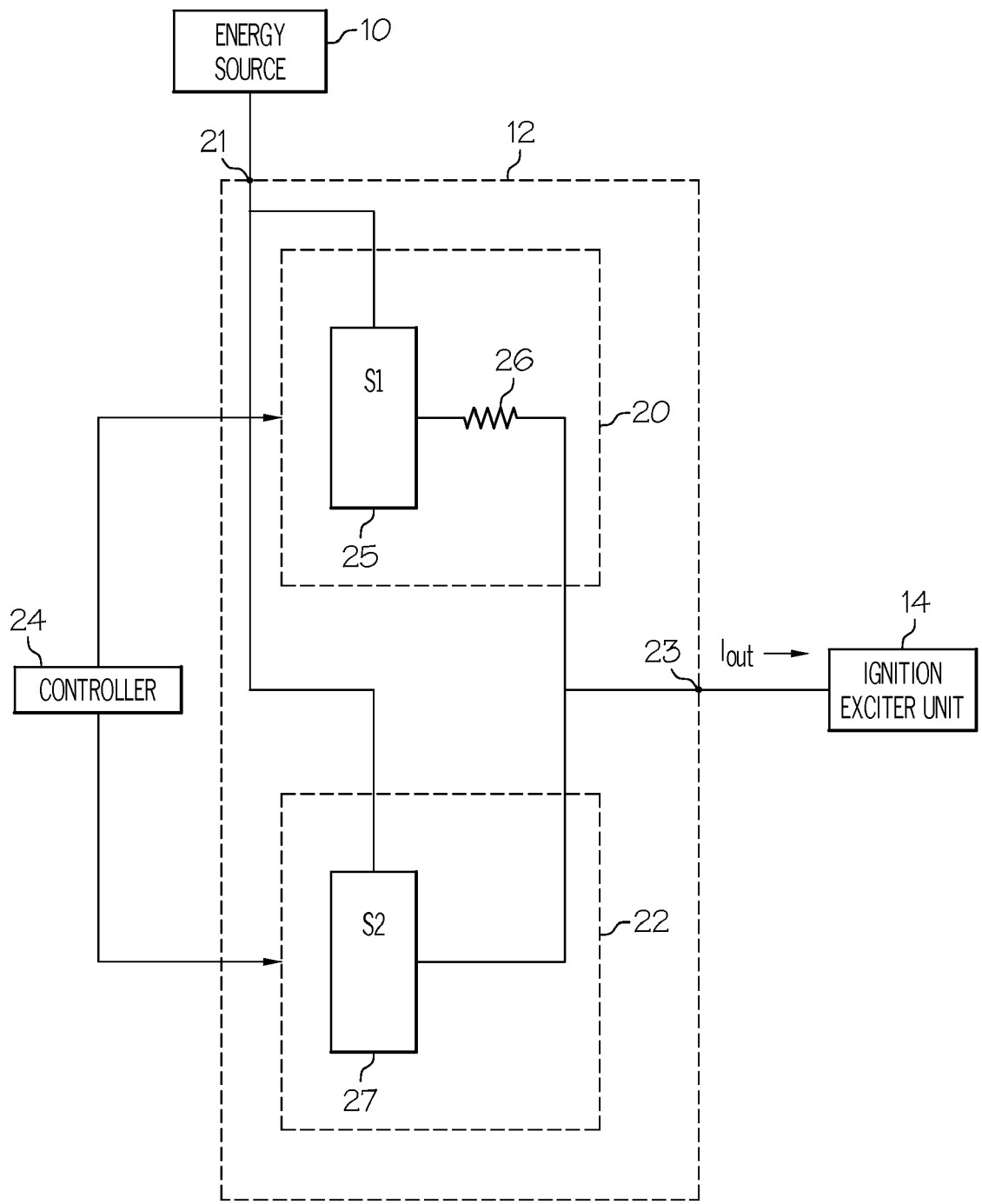
FIG. 2 is a block diagram of a driver circuit in accordance with one embodiment.

Referring now to FIG. 2, in an exemplary embodiment, the driver circuit 12 may comprise a first current-protected circuit 20 and a second current-protected circuit 22, each coupled to an input terminal 21 and an output terminal 23, such that the first current-protected circuit 20 and the second current-protected circuit 22 are electrically parallel. The phrase "current-protected" as used herein should be understood to refer to circuits, devices, or components providing overcurrent or short circuit protection. The first current-protected circuit 20 may further comprise a first current-protected switch 25 and a resistor 26, and the second current-protected circuit 22 may comprise a second current-protected switch 27. In an exemplary embodiment, a controller 24 may be coupled to the first current-protected circuit 20 and the second current-protected circuit 22, and be configured to perform various tasks and functions as described below. In an exemplary embodiment, the input terminal 21 may be coupled to the energy source 10, and the output terminal 23 may be coupled to an input of the ignition exciter unit 14 as shown.

In an exemplary embodiment, the first current-protected circuit 20 may comprise a first current-protected switch 25 coupled to a resistor 26. In an exemplary embodiment, the current-protected switch 25 is an integrated circuit that is suitably configured to provide short circuit protection. In accordance with one embodiment, the current-protected switch 25 may comprise a high-side switch, the high-side switch being designed to connect a power source to a load and pass input voltage and current to the load without any current-limiting function. In an exemplary embodiment, the current-protected switch 25 is an automotive high-side switch with a current rating below the current needed to reliably drive the ignition exciter unit 14. In an exemplary embodiment, the automotive high-side switch has current rating of 4 amps. In addition to providing short circuit protection, the automotive high-side switch may further provide additional protection, such as overload protection, thermal shutdown, overvoltage protection, reverse battery protection, and/or electrostatic discharge protection (ESD).

In an exemplary embodiment, the current supplied by the first current-protected circuit 20 is limited by coupling the resistor 26 to the first current-protected switch 25 in series (e.g., between the switch and the output terminal 23). The phrases "limited current," "current-limited," "limiting the current," and equivalents thereof should be understood as reducing the voltage at the output terminal 23 as a result of a voltage drop across a circuit element, and thus limiting the current supplied to the output terminal 23. Conversely, a non-limited current refers to a current supplied by conductors or circuits that do not include or incorporate series-connected resistive elements. In an exemplary embodiment, the resistor 26 has a nominal resistance of 10 ohms and is capable of handling high-peak power pulses well. In accordance with one embodiment, the resistor 26 is a wire wound resistor capable of handling a high current over a short time period. It should be understood that the resistance value may vary depending on the operating characteristics of the ignition exciter unit 14 and other system components, as discussed in greater detail below. In alternative embodiments, in addition to or in place of the resistor 26, other suitable means for limiting current through the first current-protected circuit 20 may be used, such as potentiometers, thermistors, thyristors, diodes, transistors, integrated circuits, and various combinations thereof.

In an exemplary embodiment, the second current-protected circuit 22 may comprise a second current-protected switch 27. In an exemplary embodiment, the second current-protected switch 27 is identical to the first current-protected switch 25 in form and function, however, in alternative embodiments, the switches 25, 27 may be of a different type and have different operating characteristics, current ratings, etc.

As shown in FIG. 2, in an exemplary embodiment a controller 24 may be coupled to the current-protected switches 25, 27. In accordance with one embodiment, the controller 24 is a microcontroller embodied as part of the driver circuit 12. In alternative embodiments, the controller 24 and/or the associated functionality (as discussed below) may be embodied or incorporated as part of the control system 18, another control module, or as a standalone component. In an exemplary embodiment, the controller 24 may be designed to perform a process for driving an ignition exciter unit 14 and the tasks, functions, and operations described below. The various tasks performed in connection with the driving the ignition exciter unit 14 may be performed by software, hardware, firmware, or any combination thereof. For illustrative purposes, the following description of the process for driving an ignition exciter unit 14 may refer to elements mentioned above in connection with FIGS. 1-2. In practice, portions of the process may be performed by different elements of the described system. It should be appreciated that driving an ignition exciter unit 14 may include any number of additional or alternative tasks, and the process for driving an ignition exciter unit 14 may be incorporated into a more comprehensive procedure or process having additional functionality not described in detail herein.

Figure 3:
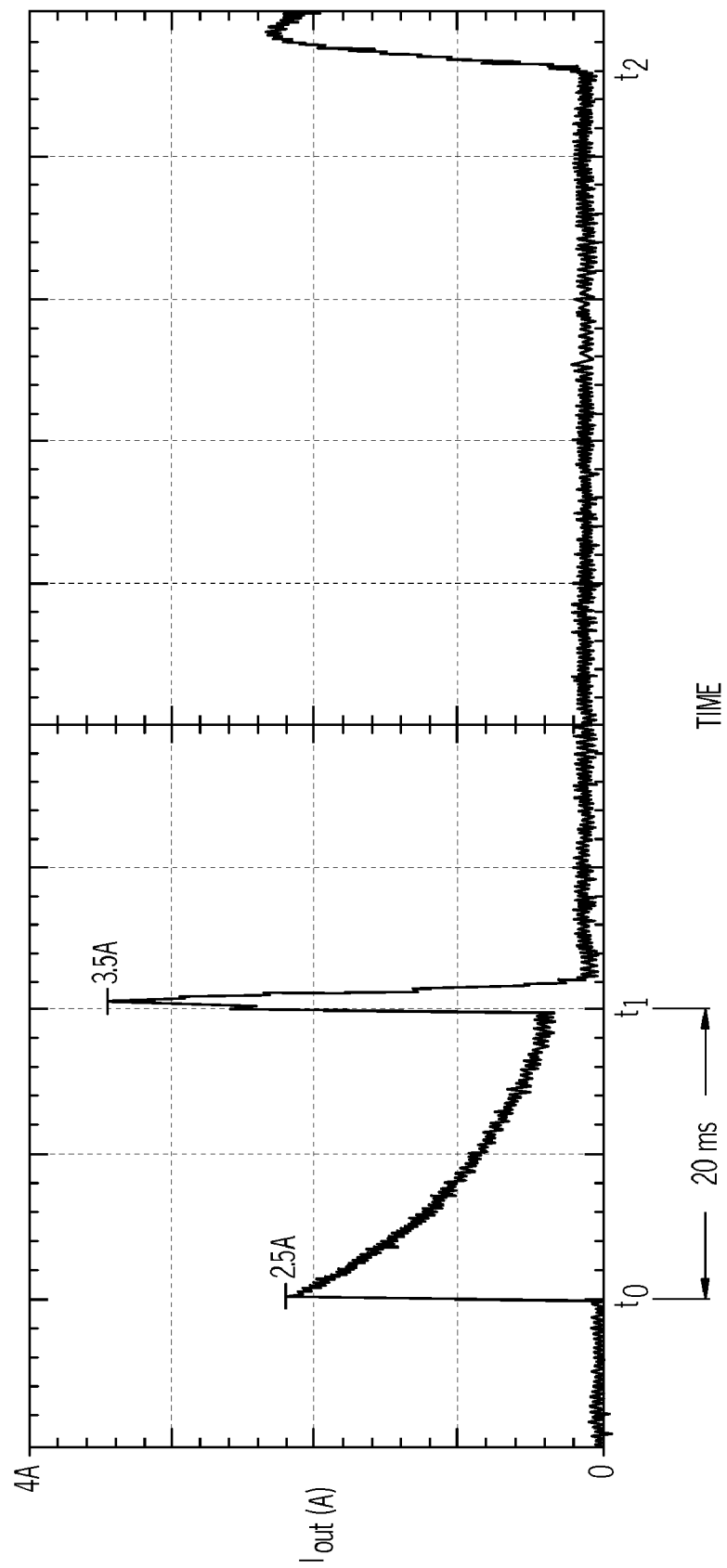
FIG. 3 is a graph of a driver circuit output current versus time for an exemplary embodiment.

Referring now to FIGS. 2 and 3, in accordance with one embodiment, the driver circuit 12 may supply a limited current to the ignition exciter unit 14 from the first current-protected circuit 20 by activating the first current-protected circuit 20 for a first time interval. After the first time interval and prior to when the ignition exciter unit 14 begins operating, the second current-protected circuit 22 may be activated such that the driver circuit 12 may further supply current to the ignition exciter unit 14 from the second current-protected circuit 22. In an exemplary embodiment, the first current-protected circuit 20 may be deactivated in response to activating the second current-protected circuit 22. The second current-protected circuit 22 may be deactivated when the ignition exciter unit 14 completes an ignition cycle. It will be appreciated in the art that by virtue of the parallel configuration, in alternative embodiments, the first current-protected circuit 20 may remain activated when the second current-protected circuit 22 is activated, and the first and second current-protected circuits 20, 22 may be deactivated when the ignition exciter unit 14 completes an ignition cycle.

Referring again to FIGS. 2 and 3, for the first time interval (time $t_0$ to $t_1$), the driver circuit 12 effectively pre-charges the input capacitance of the ignition exciter unit 14 by supplying the ignition exciter unit 14 with a limited current. By pre-charging the input capacitance, inrush current to the ignition exciter unit 14 is reduced when a non-limited current is supplied. In the exemplary embodiment, there is a delay between the time current is first supplied to the ignition exciter unit 14 and the time when the ignition exciter unit 14 begins operating (time $t_2$). When the ignition exciter unit 14 begins to function, it may draw more current than the limited current that can be provided by the first current-protected circuit 20. Therefore, in an exemplary embodiment, the second current-protected circuit 22 is activated prior to the ignition exciter unit 14 demanding a higher operating current.

In an exemplary embodiment, the duration of the first interval ($t_0$ to $t_1$) is selected such that the inrush current supplied to the ignition exciter unit 14 from the second current-protected circuit 22 does not exceed the current rating of the second current-protected switch 27 when the second current-protected switch 27 is activated. As shown for an exemplary ignition exciter unit 14, when a resistor 26 with a nominal resistance of 10 ohms is used with a 28 volt energy source 10 and current-protected switches 25, 27 with 4 amp current ratings, selecting a first interval of 20 milliseconds pre-charges the input capacitance such that the inrush current does not exceed the 4 amp current rating at time $t_1$. It will be appreciated in the art that different ignition exciter units 14 may have different operating characteristics (such as input capacitance, start-up delay, etc.), and depending on the components used, the timing may be adjusted accordingly to achieve reliable operation. For example, the time between when the applied voltage reaches the minimum operating voltage, and the time when the ignition exciter unit 14 actually begins to function may vary depending on the ignition exciter unit 14. It will be appreciated in the art that the time for supplying a non-limited current, $t_1$, can be adjusted between $t_0$ and $t_2$, depending on the current ratings of the switches 25, 27, the resistor 26, and the operating characteristics of the ignition exciter unit 14. In an exemplary embodiment, $t_1$, is chosen at a time where the current flowing to the ignition exciter unit 14 reaches a relatively low value which indicates that the input capacitor has been sufficiently charged.

Referring again to FIGS. 2 and 3, in an exemplary embodiment, the controller 24 may be configured to activate the first current-protected circuit 20 for the first time interval. The controller 24 may activate the first current-protected circuit 20 (i.e., by switching on S1) at an initial time $t_0$. At a subsequent time $t_1$, the controller 24 may activate the second current-protected circuit 22 (i.e., by switching on S2). The timing may be predetermined based on known operating characteristics of the ignition exciter unit 14 and stored within the controller 24 in a lookup table, database, etc. In alternative embodiments, one or more comparators may be used to activate the current-protected circuits 20, 22 in real-time based on the voltage and current levels of the system, as will be appreciated in the art. In accordance with one embodiment, the controller 24 may further be configured to deactivate the first and second current-protected circuits 20, 22. It will be appreciated that alternative means for activating the current-protected circuits 20, 22 may be employed. For example, the control system 18, various control modules, or other electronic control units (ECUs) may be employed in addition to or in place of the controller 24, as will be appreciated in the art.

One advantage of the system and/or method described above is that the driver circuit 12 can reliably provide power to the ignition exciter unit 14 while providing protection against a potential short circuit or other fault conditions. Furthermore, the depicted driver circuit 12 includes only a first current-protected switch 25, a resistor 26, and a second current-protected switch 27. The driver circuit 12 may be realized using only three components, resulting in greatly improved component density and lower assembly costs. The first and second current-protected switches 25, 27 may be variously implemented, but are preferably implemented using identical integrated circuit automotive high-side switches. The operation of the driver circuit 12 may be modified based on the specific start-up characteristics of the ignition exciter unit 14, and may be adapted to a variety of applications accordingly. Using the methods described herein, the current-protection feature of the current-protected switches 25, 27 is not triggered by the inrush current, and stable power is supplied to the ignition exciter unit 14 at the appropriate time.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for driving an ignition exciter unit, the ignition exciter unit having an input coupled to a first current-protected circuit and a second current-protected circuit, the method comprising:
   supplying a first current to the ignition exciter unit from the first current-protected circuit for a first time interval, wherein the first current is limited by the first current-protected circuit; and
   supplying a second current to the ignition exciter unit from the second current-protected circuit after the first time interval and prior to when the ignition exciter unit begins operating.

2. The method of claim 1, further comprising pre-charging an input capacitance of the ignition exciter unit.

3. The method of claim 1, further comprising activating the first current-protected circuit for the first time interval.

4. The method of claim 3, further comprising activating the second current-protected circuit after the first time interval and prior to when the ignition exciter unit begins operating.

5. The method of claim 4, further comprising deactivating the first current-protected circuit in response to activating the second current-protected circuit.

6. The method of claim 5, further comprising deactivating the second current-protected circuit when the ignition exciter unit completes an ignition cycle.

7. The method of claim 4, further comprising deactivating the first current-protected circuit and the second current-protected circuit when the ignition exciter unit completes an ignition cycle.

8. The method of claim 3, wherein the first current-protected circuit comprises a current-protected switch coupled to a resistor.

9. The method of claim 8, wherein the current-protected switch is an automotive high-side switch.

10. The method of claim 1, wherein the first time interval is 20 milliseconds.

11. A driver circuit for use with an ignition exciter unit, the driver circuit having an input terminal and an output terminal, the driver circuit comprising:

a first current-protected circuit coupled to the input terminal and the output terminal, the first current-protected circuit being current-limited;

a second current-protected circuit coupled to the input terminal and the output terminal, wherein the first current-protected circuit and the second current-protected circuit are electrically parallel between the input terminal and the output terminal; and a controller coupled to the first current-protected circuit and the second current-protected circuit, the controller being configured to:

activate the first current-protected circuit for a first time interval; and activate the second current-protected circuit after the first time interval and prior to when the ignition exciter unit begins operating.

12. The driver circuit of claim 11, wherein the second current-protected circuit comprises a current-protected switch.

13. The driver circuit of claim 12, wherein the current-protected switch is an automotive high-side switch.

14. The driver circuit of claim 11, wherein the controller is configured to:

deactivate the first current-protected circuit in response to activating the second current-protected circuit; and deactivate the second current-protected circuit when the ignition exciter unit completes an ignition cycle.

15. The driver circuit of claim 11, wherein the first current-protected circuit further comprises:

a current-protected switch; and a resistor coupled to the current-protected switch, wherein the current-protected switch and the resistor are electrically in series between the input terminal and the output terminal.

16. The driver circuit of claim 15, wherein the current-protected switch is an automotive high-side switch.

17. A driver circuit for use with an ignition exciter unit, the driver circuit being coupled to an energy source and an input of the ignition exciter unit, the driver circuit comprising:

a first current-protected switch coupled to the energy source and an input of the ignition exciter unit;

a second current-protected switch coupled to the energy source and the input of the ignition exciter unit, the second current-protected switch being electrically parallel to the first current-protected switch between the energy source and the input of the ignition exciter unit;

means for limiting current through the first current-protected switch;

means for activating the first current-protected switch for a first time interval; and means for activating the second current-protected switch after the first time interval and prior to when the ignition exciter unit begins operating.

18. The driver circuit of claim 17, wherein the first current-protected switch is an automotive high-side switch.

19. The driver circuit of claim 17, wherein the second current-protected switch is an automotive high-side switch.

20. The driver circuit of claim 17, wherein the means for limiting current through the first current-protected switch comprises a resistor coupled to the first current-protected switch and the input of the ignition exciter unit.

* * * * *